Nov. 9, 1926.  
E. A. JOHNSTON ET AL  
MOTOR CULTIVATOR TRACTOR  
Filed March 15, 1920  5 Sheets-Sheet 4  
1,606,706
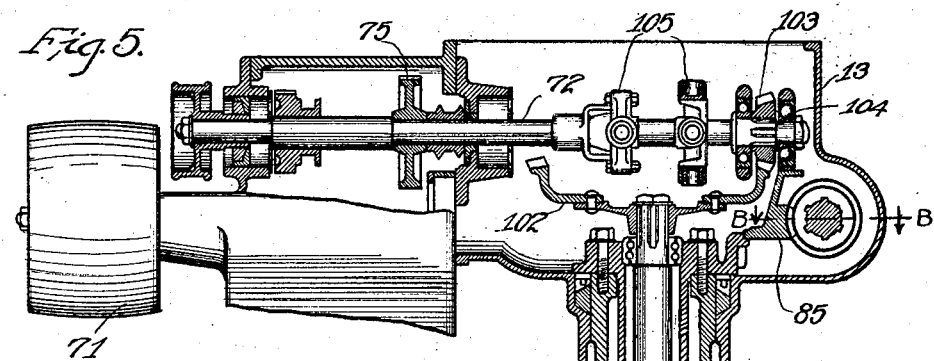
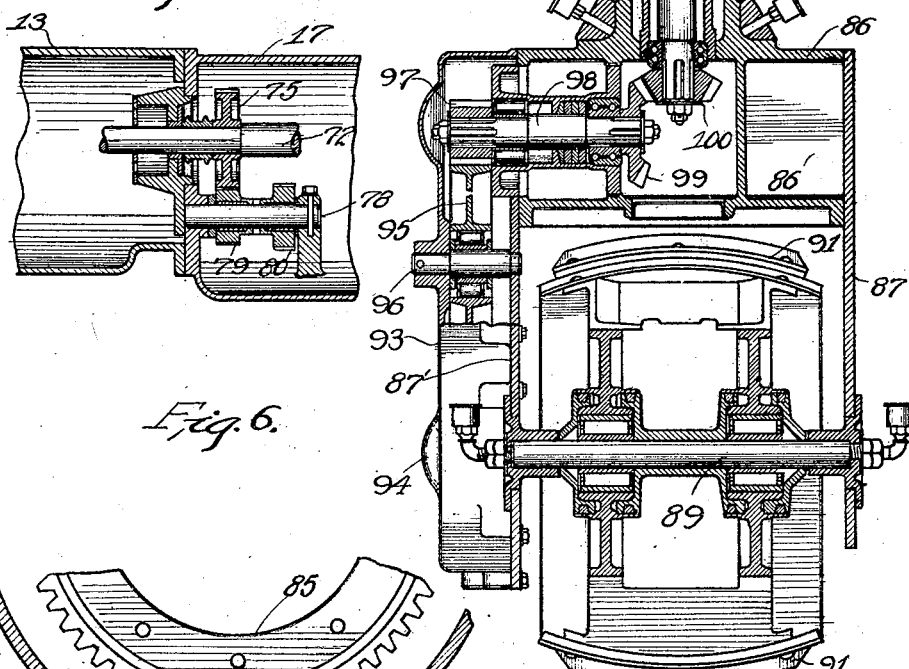
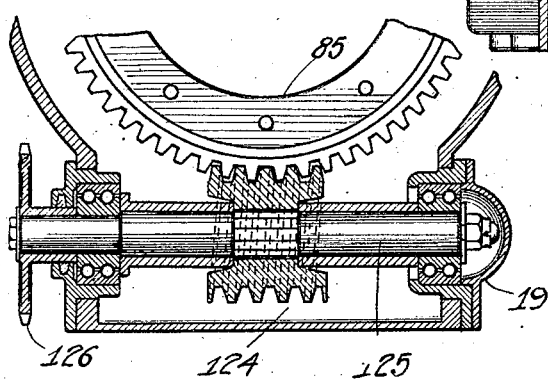
Inventor:  
Edward A. Johnston  
and Carl W. Mott  
By Henry J. Savage

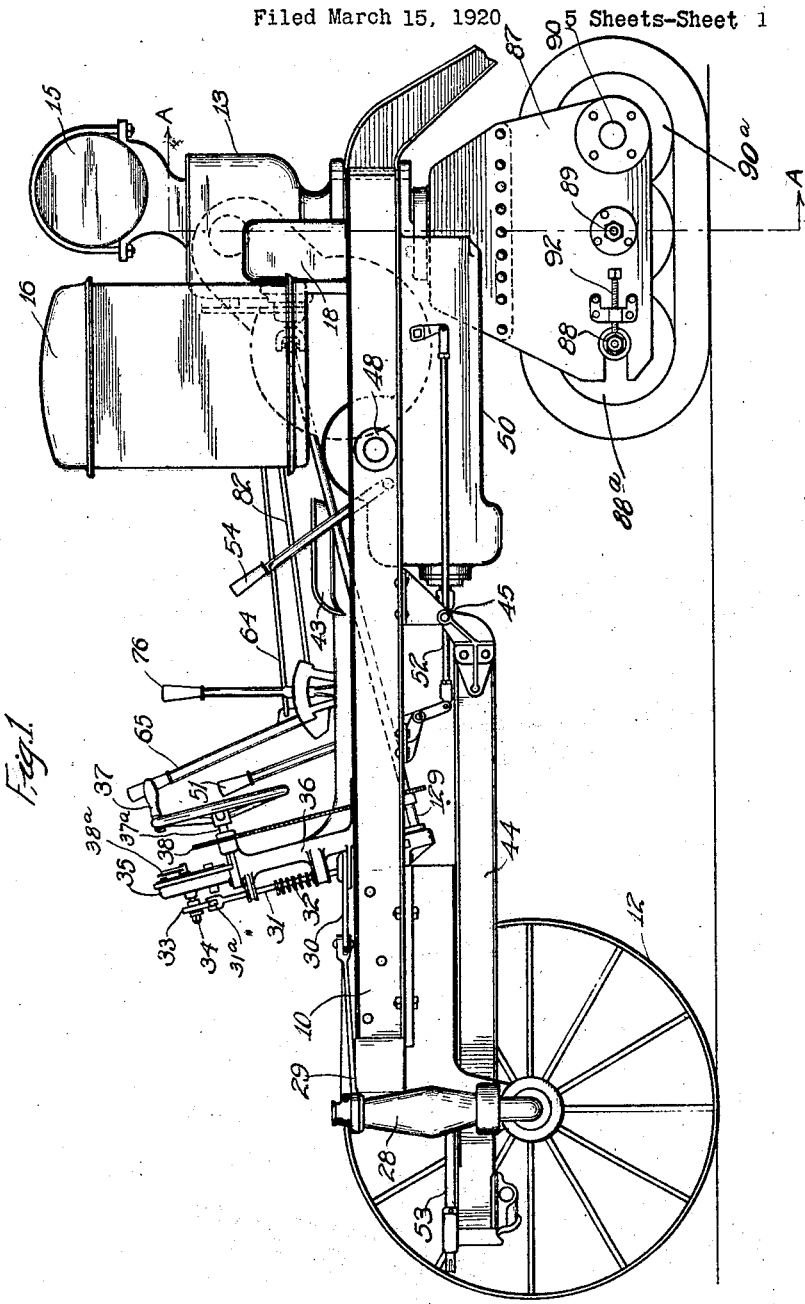

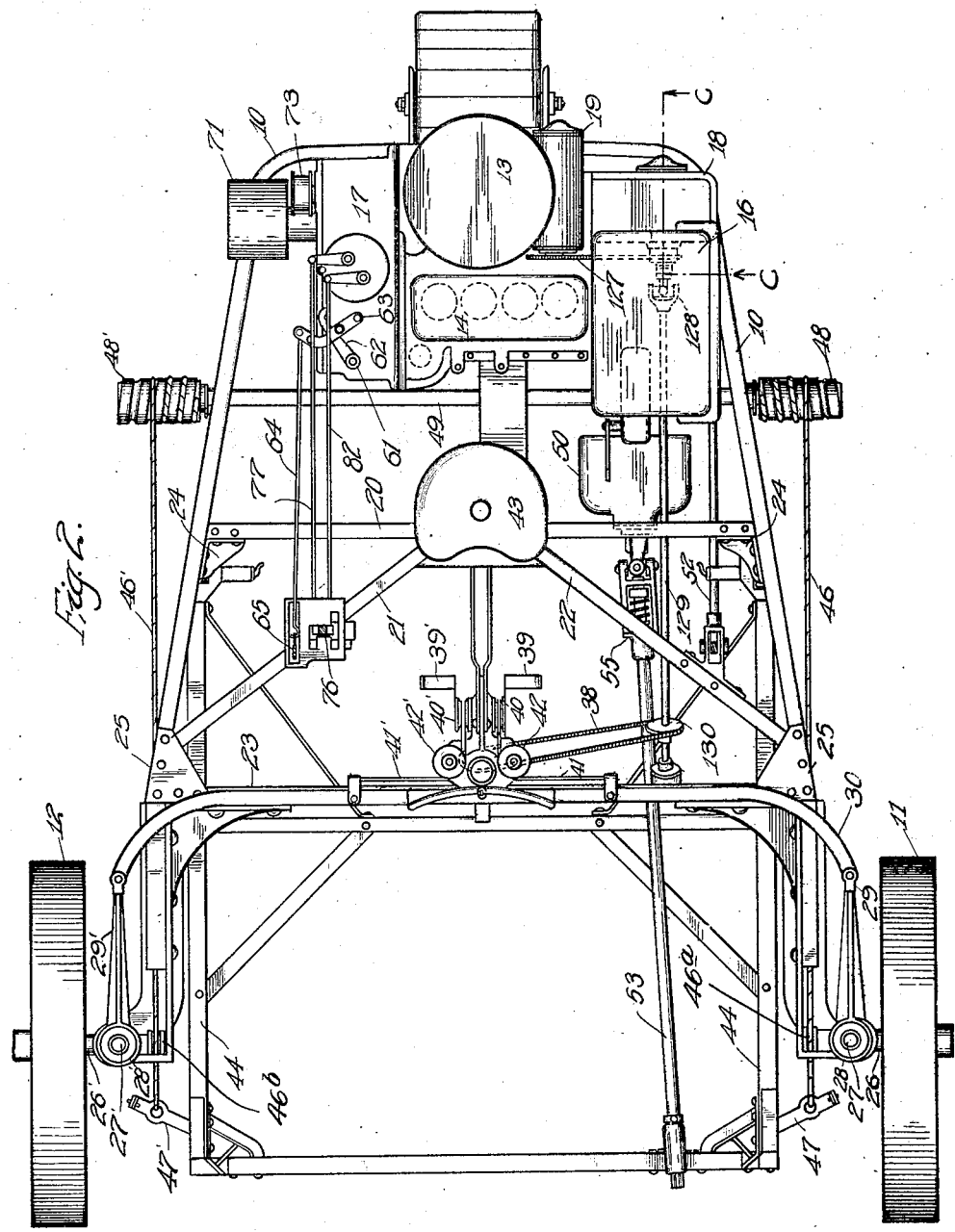

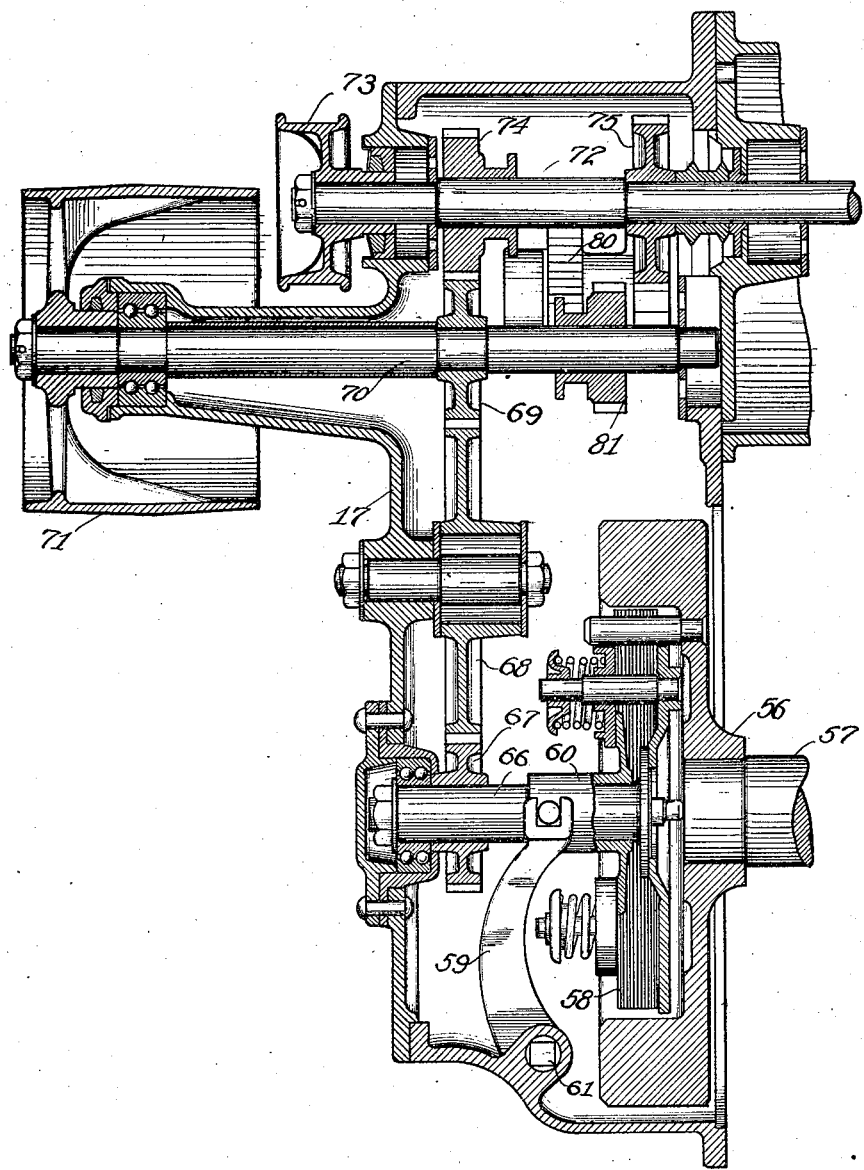

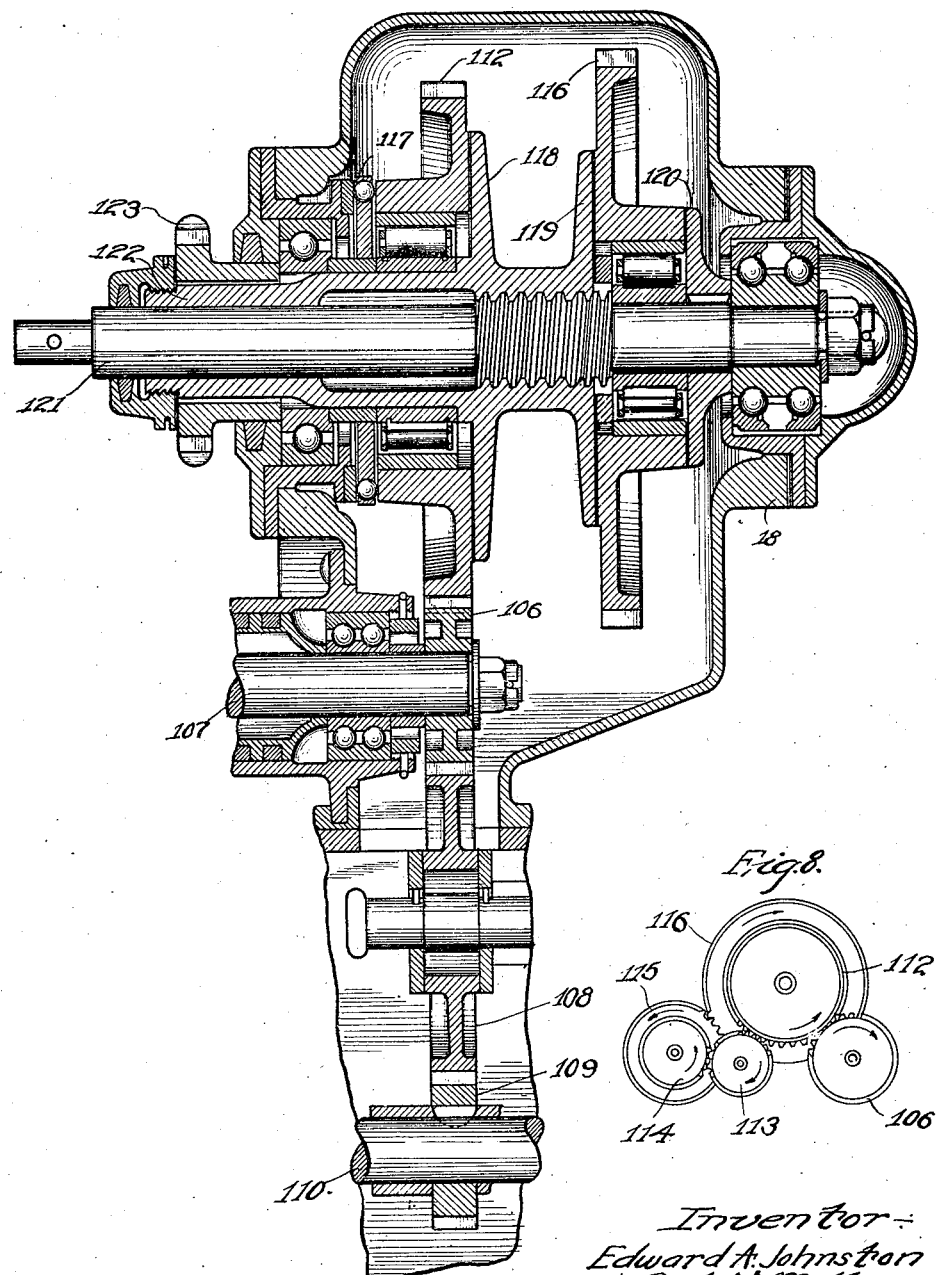

Patented Nov. 9, 1926.

1,606,706

UNITED STATES PATENT OFFICE.

EDWARD A. JOHNSTON, OF CHICAGO, AND CARL W. MOTT, OF ROCK FALLS, ILLINOIS, ASSIGNORS TO INTERNATIONAL HARVESTER COMPANY, A CORPORATION OF NEW JERSEY.

MOTOR CULTIVATOR TRACTOR.

Application filed March 15, 1920. Serial No. 366,009.

Our invention relates to tractors and particularly to tractors adapted for use with a wide variety of agricultural implements and for general utility purposes.

An object of our invention is to provide a tractor that is adapted to propel agricultural implements of all kinds such as plows, cultivators, harrows, mowers, binders, harvesters and the like, and is also adapted to be used as a source of power to drive machines such as threshers, ensilage cutters, hay balers, saws and the like.

A second object is to provide a tractor which from its construction and means for control is particularly adapted to propel a cultivator between rows of growing crops, the cultivator, as well as other implements propelled by the tractor, being attached to the front of the tractor in full view of the operator and under his direct control.

A further object is to provide a tractor adapted to propel various types of agricultural implements and to effect a short turning movement of the implement and tractor.

A still further object is to provide a tractor having a belt or endless track drive in which the track is angled by power driven means for steering the tractor.

Another object is to provide a tractor that will be both driven and steered by power derived from a single power unit.

Another object is to provide a power steered tractor in which the steering means and driving means are operatively independent although both derive power from the same power unit.

An additional object is to provide a tractor that is normally power steered but is provided with a manual steering means controlled by the operation of the power steering means.

The above and other objects will be apparent from the following description of our invention when read in connection with the accompanying drawings in which:

Fig. 1 is a side elevation of a tractor embodying our invention, the front wheel nearest the observer being omitted.

Fig. 2 is a plan view, the fuel tank shown in Fig. 1 being omitted for the sake of clearness.

Fig. 3 is a sectional view of the power transmission means connecting the engine to the tractor driving means.

Fig. 4 shows a detail of the transmission assembly of Figure 3.

Fig. 5 is a vertical sectional view of the tractor driving and steering means taken on the line A—A Fig. 1.

Fig. 6 is a detail view of a part of the steering mechanism taken on the line B—B Fig. 5.

Fig. 7 is a sectional view of the steering gear, the section being taken on a substantially vertical plane indicated by the line C—C in Fig. 2.

Fig. 8 is a diagrammatic view showing the arrangement of gears for driving the clutch gears of Fig. 7 in opposite directions.

Reference will now be had to Figs. 1 and 2 for a general description of our invention. The tractor comprises a main frame 10, triangular in general outline and preferably formed from light channels or other suitable structural shapes. This triangular frame is supported at its front side by two supporting wheels 11, 12, disposed at two corners of the triangle and is stiffened by the cross members and tie rods 20, 21, 22 and 23 which are secured to the frame by the angle braces 24 and gussets 25, Fig. 2. The braces and rods also serve as supporting members for mechanism to be described later. The third angle of the frame which is disposed at the rear is supported by the traction and steering member 13 shown in detail in Fig. 5. The tractor is driven and steered by power derived from an internal combustion engine 14 of usual construction. 15 indicates a fuel tank for the engine which for the sake of clearness is shown only in Fig. 1. 16 indicates the usual radiator supplying cooling water to the jackets of the engine cylinders. Power for driving the tractor is transmitted from one end of the engine shaft to the traction member through the transmission assembly 17, shown generally in Fig. 2 and in detail in Figs. 3 and 4. Power for steering the tractor is taken from the opposite end of the engine shaft and is transmitted to the steering column (to be described later) through the steering gear assembly 18, 19 indicated generally in Fig. 2 and specifically illustrated by Figs. 6, 7 and 8. The engine, fuel tank, radiator, transmission assembly, traction drive and steering assemblies referred to above are all secured to or carried by the tractor frame.

The supporting wheels 11 and 12 are mounted on horizontal axles 26, 26' which are integral with vertical steering shafts 27, 27' journaled in castings 28, 28' secured to the front of the main frame. Steering arms 29, 29' rigidly secured to the upper ends of the vertical shafts are connected by a steering link or yoke 30, which is normally held in stationary or inoperative position by a pin 31 engaged in a slot or hole in the yoke as best shown in Fig. 1.

The pin 31 is held in engagement with the apertured yoke 30 by a roller 31ᵃ engageable with a cam or eccentric member 33 fixed to a shaft 34 journaled in the upper end of a casing 35 supported on the upper end of a steering column or post 36. A spring 32 acts to keep the pin out of engagement with the yoke 30 when the cam is not acting to hold the pin down. Journaled in the steering column 36 is a hand operated power steering control wheel 37 having chain and sprocket connection 38 with the power steering mechanism to be described later. This hand wheel 37 turns a shaft 37ᵃ journaled in the casing 35, which shaft, through reduction gearing within the casing, drives shaft 34 at much reduced speed. Thus, it will be seen the hand control wheel 37 is so connected with the shaft 34 that it will have to be given a certain number of turns before the pin 31 can withdraw from the yoke 30. This initial independent rotation of wheel 37 is necessary, as will later appear, for the purpose of immediately initiating operation of power steered propelling means at the rear end of the tractor, so that the same may move substantially through an angle of 45 degrees either to the left or to the right before the pin 31 is withdrawn. An indicator vane 38ᵃ may be mounted as shown to indicate to the operator the angular position of the propelling means.

Referring to Fig. 2, pedals 39, 39', constituting manually operated steering means are shown connected to sheaves 40, 40' pivotally mounted on the frame to each of which is secured one end of a chain or cable 41, 41' passing over sheaves 42, 42' and secured at their opposite ends to ears or lugs on the yoke 30. When the pin 31 is raised to release the yoke 30, the front wheels 11, 12 may be steered by means of the pedals 39, 39' by the operator occupying the seat 43 or if the operator's feet are raised from the pedals, the front wheels will be free to caster on the vertical shafts 27, 27' to effect a short quick turning movement of the tractor in conjunction with the power steering means as will presently be apparent.

Referring again to Figs. 1 and 2, 44 indicates a supplemental frame pivotally connected at 45 to a bracket carried by the main frame. The front end of this frame is adapted for attachment to the implement to be propelled by the tractor and is vertically adjustable by means of the chains or cables 46, 46' passing over pulleys 46ᵃ, 46ᵇ and secured at one end to the supplemental frame at 47, 47', the other end being secured to and winding on the drums 48, 48' keyed to the shaft 49. The shaft 49 is journaled in bearings carried by the tractor frame 10 and is adapted to be rotated to raise or lower the supplemental frame 44 by power derived from the engine. Power is transmitted to the shaft 49 through a clutch assembly mechanism housed in the casing 50 and shown only generally in this application. The lever 51 and link 52 are adapted to shift the clutch within the casing 50 to rotate the shaft 49 in either direction to raise or lower the frame or to release the clutch so that the frame 44 is held in any adjusted position.

Carried by the frame 44 is a power shaft 53 adapted to transmit power to the cutter bar of a mower, binder, or other implement propelled by the tractor and requiring power for its operation. This shaft is driven from the main engine 14 through the clutch assembly mechanism in the housing 50, the lever 54 being adapted to cause engagement or release of the clutch. The universal coupling 55 in the shaft 53 permits this shaft to be raised or lowered with the supplemental frame, the pivot of the coupling being in alignment with the pivotal supports 45.

While we have disclosed the supplemental frame, power driven means for raising and lowering it, and the implement driving shaft in connection with our tractor, these features form no part of the present invention but are illustrated to show the complete commercial form of the tractor.

Having described our invention in a general way, we will now refer to Figs. 3 to 8 for a detailed description of the power drive and steering mechanisms.

*Power transmission assembly.*

Figs. 3 and 4 are detail views of the power transmission assembly indicated by the number 17 in Fig. 2. Referring particularly to Fig. 3, 56 is the fly-wheel forming one member of a multiple disc clutch keyed or otherwise secured to the engine crank shaft 57. The main clutch 58 is operated by a forked arm 59 engaging a sleeve 60 in the usual manner. The arm 59 is keyed or otherwise secured to one end of a short vertical shaft 61 journaled in the transmission housing 17 and having secured at its opposite end the clutch operating cam 62. A lever 63 carrying a cam engaging roller (Fig. 2) is pivoted at one end to the casing 17 in position so that the roller will engage and operate the cam 62 and has connected to its other end one end of a link or rod 64. The other end of the link is operatively connected to the clutch lever 65 mounted on the tractor frame convenient to the operator. When the lever 65 is in its forward position as shown in Figs. 1 and 2, the lever 63 is rocked forward, the roller carried thereby having engaged and partially rotated the cam 62 and its connected arm 59 counter clockwise (Figs. 2 and 3). This movement of the arm shifts the sleeve 60 to the left (Fig. 3) against the tension of the clutch springs to release the clutch. When the lever 65 is shifted rearwardly, the lever 63 is rocked clockwise (Fig. 2) to release the cam 62 to permit the clutch springs to engage the clutch discs.

The main clutch transmits power from the engine shaft to the shaft 66 carrying the gear 67 meshing with a gear 68 rotatably mounted on a stub shaft secured in a side wall of the transmission casing. The gear 68 meshes with a gear 69 keyed to the power shaft 70 journaled in the casing and carrying at its outer end a pulley 71 adapting the tractor for use as a power plant.

Parallel with the power shaft 70 is the tractor drive shaft 72 carrying at its outer end a brake drum 73 and extending at its other end through the transmission casing 17 into the traction housing 13 (Fig. 5). The shaft 72 carries within the transmission-casing a gear 74 splined thereto and a gear 75 keyed thereon. The gear 74 is adapted to be shifted by the lever 76 and link 77 (Figs. 1 and 2) into or out of engagement with gear 69 for high speed drive of the tractor, the transmission providing for two speeds forward and one reverse as will now be described.

A stub shaft 78 (see Fig. 4) mounted in the transmission casing has rotatably mounted thereon two gears 79, 80 integrally formed or rigidly secured together, the gear 79 being in mesh with the gear 75. A gear 81 splined to the power shaft 70 is adapted to be shifted by the lever 76 and link 82 into engagement with the gear 75 for low speed drive of the tractor or into mesh with the gear 80 for reverse drive. A single lever 76 is employed for shifting the gears 74 and 81, it being necessary to move one of the gears into neutral position before the other can be engaged with its cooperating gear as is usual in the art.

The brake drum 73 referred to above has associated therewith a brake band operatively connected to the rod 64 of the clutch operating mechanism. When the lever 65 is in its forward position and the clutch disengaged, the brake band will be tightened on the drum 73 to quickly stop the tractor. Since the connections between the brake and rod 64 are familiar to those skilled in the art, they have been omitted from the drawings to avoid needless complications.

*Tractor driving mechanism.*

Referring to Fig. 5, the tractor driving and steering housing 13 is secured to or formed integral with a vertically disposed casing 83 secured to the tractor frame. Journaled within the vertical casing is the tubular steering post 84 having secured at its upper end the segmental worm wheel 85 and provided at its lower end with the flanges 86, 86' to which are secured by rivets or otherwise the vertical side plates 87, 87'.

These side plates form a supporting frame for the rear end of the tractor and transmit the driving thrust of the endless track to the main tractor frame. The side plates are provided with three alined pairs of bearings in which are journaled the shafts 88, 89, 90 (Fig. 1). The rear shaft 90 is provided midway between its ends with a driving sprocket 90ª (Fig. 1) adapted to engage and drive the overlapping plates 91 forming the endless track drive of the tractor. The shaft 89 has mounted thereon a pair of idlers or supporting rollers for the track as best shown in Fig. 5. The forward shaft 88 carries a centrally disposed idler sprocket 88ª adapted to engage the track and adjustable forwardly and rearwardly by means of the adjusting screws 92 (Fig. 1) to maintain the proper tension in the track. There are two of the adjustable screws 92, one on each side plate 87, 87'. To the plate 87' is secured a gear casing 93 into the lower end of which projects one end of the drive sprocket shaft 90. A gear (not shown in the drawings but housed within the casing at 94) is keyed to this end of the shaft 90 and meshes with an idler 95 journaled on a roller bearing on the supporting shaft 96. The idler is driven by a pinion 97 secured to one end of a shaft 98 mounted in bearings supported between the flanges 86, 86' of the steering column. The opposite end of the shaft 98 carries a bevel gear 99 meshing with a bevel pinion 100 on the lower end of a vertical drive shaft 101 journaled within and concentric with the steering column. The upper end of the vertical drive shaft has keyed thereto a bevel gear 102 meshing with a bevel pinion 103 on the horizontal drive shaft 72. The shaft 72 is journaled at one end in a bearing 104 carried by the steering sector 85 and is provided with two universal couplings 105 for a purpose to be described later.

From the above description it is apparent that power is transmitted from the engine 14 to the traction shoes 91 to drive the tractor through the mechanism specifically disclosed in Figs. 3, 4 and 5 and that the tractor has two speeds forward and one reverse. It is also apparent that when the transmission gears 74 and 81 are in neutral position, the shaft 70 carrying the belt pulley 71 will be driven and the tractor may then be used as a power plant to operate belt driven machines of various kinds.

Power steering mechanism.

Attention is now invited to the power steering mechanism and particularly to Figs. 6, 7 and 8. In Fig. 7 the pinion 106 is secured to a shaft 107 driven from the internal combustion engine 14 at the side opposite the fly wheel 56 in Fig. 3. The pinion drives an idler 108 which in turn drives a gear 109 keyed to a shaft 110 adapted to drive the implement driving shaft 53 previously referred to. The pinion 106 meshes with and directly drives a clutch gear 112 and through this clutch gear and intermediate gears 113, 114 and 115 (shown diagrammatically in Fig. 8) drives the clutch gear 116 in a direction opposite to the direction of rotation of the clutch member 112. The clutch member or gear 112 is mounted on a roller bearing within the steering gear housing 18 and at one side engages a thrust bearing 117 and at its opposite side is adapted to be engaged by one disc 118 of a two way disc clutch, the other clutch disc 119 being adapted to engage a clutch face on one side of the gear 116, the opposite side of gear 116 engaging a thrust collar 120 keyed to the clutch operating shaft 121. The discs 118 and 119 are formed integral with a sleeve 122 having screw threaded engagement with the shaft 121 and having a sprocket 123 secured thereto at the end opposite the clutch discs. Referring to Fig. 6, the steering segment 85 has meshing therewith a worm 124 carried by the shaft 125 journaled in the casing 19. The shaft 125 projects at one end beyond the casing and carries a sprocket 126 driven by a chain 127 (Fig. 2) from the sprocket 123 (Fig. 7). The clutch operating shaft 121 is connected by a universal coupling 128 to the steering shaft 129 (Figs. 1 and 2) which has keyed near its forward end a sprocket 130 cooperating with the chain 38 and control wheel 37 described in connection with the manual steering means.

Assuming now that the tractor is in motion propelling an implement and the operator wishes to turn to the left, the control wheel 37 will be rotated to the left (or counter clockwise) which through the chain 38 sprocket 130 and shaft 129 will rotate clutch shaft 121 in the same direction. Owing to the screw threaded engagement of the shaft 121 with the clutch sleeve 122, the disc 119 will be shifted to the right (Fig. 7) into engagement with the clutch face of gear 116 which is continuously rotated from the shaft 107 and intermediate gears in left hand direction or counterclockwise when viewed from the right in Fig. 7. Engagement of the clutch members 119 and 116 rotates the sleeve 122 and its sprocket 123 in the same direction that the shaft 121 and control wheel are turned, thus driving the sprocket 126 and worm 124. The inclination of the worm is such that left hand rotation of control wheel 37 rotates the steering worm wheel 85 to angle the traction device to the right. The rear end of the tractor will then travel to the right about the front supporting wheels to effect a left turning movement of the tractor. It is thus seen that a left hand rotation of the control wheel causes engagement of the clutch members 119 and 116 to effect a left hand turn of the tractor and conversely a right hand rotation of the control wheel will cause engagement of the clutch members 118 and 112 to cause a right hand turn of the tractor.

It will be noted from Fig. 7 that whichever way the shaft 121 is rotated, the corresponding clutch disc 118 or 119 will engage the clutch gear 112 or 116 rotating in the same direction. This will tend to release the clutch as soon as it is engaged by rotating the sleeve on the screw threaded shaft. In order to keep the clutch in driving engagement it is therefore necessary for the operator to continue to rotate the control wheel 37 until the tractor driving means has been angled sufficiently to make a turn of the desired radius. If a short turn is desired, as when the tractor is driving a cultivator and has reached the end of a row and it is necessary to make a turn of 180° to enter the tractor between the next adjacent rows, the control wheel 37 will be rotated and the clutch members kept in engagement until the tractor drive is angled through approximately 45° at which time the locking pin 31 previously described will be raised to release the yoke 30. This releases the manually operated steering mechanism for the front wheels 11 and 12 permitting them to be angled to effect a very short quick turn of the tractor. In practice it has been found that our tractor can turn within substantially its own length through cooperation of the two steering means.

When the steering sector 85 is turned by the worm 124, it carries with it the tractor drive shaft 72 and rotates the steering post 84, vertical drive shaft 101 and all of the tractor driving mechanism supported by the frame 87, 87'. The universal couplings 105 in the shaft 72 and bearing 104 are provided to make possible this turning movement. It will be understood of course that when the steering mechanism is in operation the tractor is also being driven by power transmitted through shaft 72 and gears 103, 102. When the vertical shaft 101 and gear 102 are angled in the steering operation of the tractor, there would be relative rotation or planetary movement between the gears 102 and 103 except for the universal couplings in shaft 72. These couplings permit the shaft to swing with the steering sector without changing the relative speeds of the shafts 72 and 101. Except for this construction, the steering mechanism would be forced to angle the tractor against the power of the engine when turning in one direction which would throw a heavy overload on the clutches 118 and 119. If the bearing 104 were carried by the casing 13 and the shaft 72 were continuous, then the shaft 101 and tread 91 would either be speeded up or retarded whenever the tractor was turned.

While we have shown and described but a single embodiment of our invention, it is to be understood that we do not desire to be limited thereto, but that the invention may be embodied in various modifications, and we desire to include as our invention all such modifications as fall within the scope of the subjoined claims.

What we claim as our invention and desire to secure by Letters Patent is:

1. In a tractor the combination of a frame, carrying means supporting one end of the frame, traction means supporting the other end of the frame, an engine mounted on the frame, transmission mechanism between the engine and traction means for driving the tractor, steering mechanism between the engine and traction means for power steering of the tractor, manually operated means for steering the carrying means, and means controlled by the angular position of the traction means for making the manually operated steering means operable or inoperable.

2. In a tractor, the combination of a main frame, spaced carrying means supporting one end of the frame, traction means supporting the other end of the frame and located on the longitudinal median line thereof, a power unit for driving the traction means, steering means driven by the power unit for steering the traction means, manually operated means for steering the spaced carrying means, means normally rendering the manual steering means inoperative, and means for controlling the power steering means including means for releasing the manual steering means.

3. A tractor comprising in combination a frame, supporting means for one end of the frame, traction means for the other end of the frame, an engine on the frame, driving connections between the engine and traction means, steering means for the supporting means, steering means for the traction means, and means connecting said two steering means whereby one of the means will be operative or inoperative depending on the position of the other steering means.

4. A tractor comprising in combination a frame, supporting means for one end of the frame, traction means for the other end of the frame, an engine on the frame, driving connections between the engine and traction means, steering means for the supporting means, steering means for the traction means, and connections between the two steering means whereby one of the means will be inoperative until the other means has been turned through a predetermined angle.

5. A tractor comprising in combination a frame, supporting means for one end of the frame, steering means associated with said supporting means, traction means supporting the other end of the frame, power means carried by the frame, transmission mechanism between the power means and traction means to propel the tractor, power driven steering mechanism for angling the traction means to normally steer the tractor, manually operated means for engaging and disengaging the power driven steering means, and connections between the manually operated means and the steering means associated with the supporting means.

6. In a tractor the combination of a frame, supporting means for one end of the frame, normally inoperative means for angling the supporting means, traction means supporting the other end of the frame, a power unit carried by the frame, driving connections between the power unit and traction means for propelling the tractor, steering mechanism between the power unit and traction means adapted to angle the latter to normally steer the tractor, manually operated means for throwing the steering mechanism into and out of operation, and connections between the manually operated means and the first mentioned angling means adapted to render the first mentioned angling means operative to effect a quick turning movement of the tractor.

7. In a tractor the combination of a frame, carrying means supporting the front end of the frame, normally inoperative steering means for the carrying means, propelling means supporting the rear end of the frame, steering means associated with the propelling means for normally steering the tractor, and means controlled by the angular position of the propelling means for rendering the first named steering means operative or inoperative.

8. In a tractor the combination of a frame, carrying means supporting one end of the frame, normally inoperative steering means for the carrying means, traction means supporting the other end of the frame, steering means for the traction means, manually operated controlling means for the traction steering means, and means associated with the two steering means whereby continued operation of the controlling means will render the first named steering means operative.

9. In a tractor the combination of a frame, pivotally mounted supporting means for the front end of the frame, a yoke connecting the supporting means, locking means for the yoke, traction means supporting the rear end of the frame, power driven steering means for said traction means, manually operated controlling means for the steering means and connections between the controlling means and locking means whereby operation of the controlling means may operate the locking means to release the yoke and permit angling of the front supporting means.

10. In a tractor the combination of a triangular frame having one side disposed toward the front, supporting means for the front side, a supplemental frame pivotally connected to the triangular frame and supporting the rear angle thereof, an endless track carried by the supplemental frame for propelling the tractor, a power unit carried by the triangular frame, power transmission mechanism between the power unit and endless track, power steering mechanism between the power unit and supplemental frame, and independent manually operated means for controlling the transmission and steering mechanisms.

11. In a tractor the combination of a triangular frame having one side disposed toward the front, supporting means for the front side, a supplemental frame pivotally connected to the triangular frame and supporting the rear angle thereof, an endless track carried by the supplemental frame for propelling the tractor, a power unit carried by the triangular frame and having a power shaft, transmission mechanism adapted to drive the endless track from one end of the power shaft, steering mechanism adapted to be connected to the other end of the power shaft to angle the supplemental frame, and independent means controlling the transmission and steering mechanisms.

12. In a motor vehicle the combination of a main frame, a power unit carried thereby, carrying means supporting one end of the frame, traction means supporting the other end of the frame, steering mechanism for the traction means, a vertical drive shaft for the traction means, and a flexible power shaft between the power unit and drive shaft, one end of the power shaft being carried by the steering mechanism whereby the power shaft will be angled when the vehicle is turned.

13. In a motor vehicle, a main frame, a power unit carried thereby, a supplemental frame connected by a vertical pivot to the main frame and supporting one end thereof, propelling means carried by the supplemental frame, power transmission mechanism including a flexible power shaft between the power unit and propelling means, steering mechanism adapted to angle the supplemental frame on its pivotal connection to steer the vehicle, and a connection between the steering mechanism and power shaft whereby the shaft is angled with the supplemental frame.

14. In a tractor, the combination of a main frame, spaced carrying means supporting one end of the frame, traction means supporting the other end of the frame, a power unit mounted on the frame, a vertical drive shaft for transmitting power to the traction means, a horizontal flexible power shaft for transmitting power to the drive shaft, a steering post co-axial with the drive shaft and supporting one end of the power shaft, means connecting the steering post with the traction means, and means for angling the steering post and traction means to steer the tractor.

15. In a tractor, the combination of a frame, carrying means supporting one end of the frame, traction means supporting the other end of the frame, a vertical drive shaft for the traction means, a flexible power shaft parallel to the plane of rotation of the drive shaft, a power unit mounted on the frame for driving the power shaft, a steering post co-axial with the drive shaft and having a bearing supporting the power shaft, means for angling the steering post and traction means in a plane parallel to the power shaft.

16. In a tractor, the combination of a main frame, traction means supporting one end of the frame, a drive shaft for the traction means, a flexible power shaft disposed at right angles to the axis of the drive shaft, gearing connecting the shafts, and means for turning the traction means and gearing about the axis of the drive shaft to steer the tractor.

In testimony whereof we affix our signatures.

EDWARD A. JOHNSTON.
CARL W. MOTT.